(12) United States Patent
Yamauchi et al.

(10) Patent No.: US 11,588,180 B2
(45) Date of Patent: Feb. 21, 2023

(54) BIPOLAR ALL-SOLID-STATE SODIUM ION SECONDARY BATTERY

(71) Applicant: NIPPON ELECTRIC GLASS CO., LTD., Otsu (JP)

(72) Inventors: Hideo Yamauchi, Otsu (JP); Kei Tsunoda, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 195 days.

(21) Appl. No.: 16/644,570

(22) PCT Filed: Oct. 3, 2018

(86) PCT No.: PCT/JP2018/036967
§ 371 (c)(1),
(2) Date: Mar. 5, 2020

(87) PCT Pub. No.: WO2019/078001
PCT Pub. Date: Apr. 25, 2019

(65) Prior Publication Data
US 2021/0066757 A1    Mar. 4, 2021

(30) Foreign Application Priority Data

Oct. 17, 2017   (JP)   .............................. JP2017-200915

(51) Int. Cl.
*H01M 10/00*    (2006.01)
*H01M 10/0585*    (2010.01)
(Continued)

(52) U.S. Cl.
CPC ....... *H01M 10/0585* (2013.01); *H01M 4/661* (2013.01); *H01M 4/662* (2013.01);
(Continued)

(58) Field of Classification Search
CPC ........... H01M 10/054; H01M 10/0585; H01M 10/0562; H01M 10/0561; H01M 4/661;
(Continued)

(56) References Cited

U.S. PATENT DOCUMENTS

2014/0079992 A1   3/2014 Tanaka
2014/0287305 A1   9/2014 Wachsman et al.
(Continued)

FOREIGN PATENT DOCUMENTS

CN    103548196 A     1/2014
CN    105518922   *   4/2016 ........ H01M 10/0562
(Continued)

OTHER PUBLICATIONS

English language translation (machined-generated) of CN 105518922 (Yamasaki et al, All-solid-state Battery, Apr. 20, 2016, full document).*

(Continued)

*Primary Examiner* — Raymond Alejandro
(74) *Attorney, Agent, or Firm* — Keating and Bennett, LLP

(57) ABSTRACT

Provided is a bipolar all-solid-state sodium ion secondary battery that can increase the voltage without impairing safety. A bipolar all-solid-state sodium ion secondary battery includes: a plurality of all-solid-state sodium ion secondary batteries 1 in each of which a positive electrode layer 3 capable of absorbing and releasing sodium, a solid electrolyte layer 4 made of a sodium ion-conductive oxide, and a negative electrode layer 5 capable of absorbing and releasing sodium are laid one upon another in this order; and a current collector layer 2 provided between the positive electrode layer 3 of each of the plurality of all-solid-state sodium ion secondary batteries 1 and the negative electrode layer 5 of the adjacent all-solid-state sodium ion secondary (Continued)

battery 1 and shared by the positive electrode layer 3 and the negative electrode layer 5.

7 Claims, 7 Drawing Sheets

(51) Int. Cl.
 *H01M 4/66* (2006.01)
 *H01M 10/054* (2010.01)
 *H01M 10/0562* (2010.01)
 *H01M 4/02* (2006.01)

(52) U.S. Cl.
 CPC ......... *H01M 4/663* (2013.01); *H01M 10/054* (2013.01); *H01M 10/0562* (2013.01); *H01M 2004/029* (2013.01); *H01M 2300/0071* (2013.01)

(58) Field of Classification Search
 CPC ...... H01M 4/662; H01M 4/663; H01M 4/665; H01M 4/667; H01M 2004/029; H01M 2300/0071; H01M 2300/0068; H01M 2300/0065
 See application file for complete search history.

(56) References Cited

U.S. PATENT DOCUMENTS

| 2016/0380301 A1 | 12/2016 | Kosaka et al. |
| 2017/0005337 A1 | 1/2017 | Ikejiri et al. |
| 2017/0155169 A1 | 6/2017 | Hitz et al. |

FOREIGN PATENT DOCUMENTS

| CN | 105637694 A | 6/2016 | |
| CN | 106299443 A | 1/2017 | |
| JP | 2002-075455 A | 3/2002 | |
| JP | 2002-075544 A | 3/2002 | |
| JP | 2016-042453 A | 3/2016 | |
| JP | 2016-517146 A | 6/2016 | |
| JP | 2017-010816 A | 1/2017 | |
| JP | 2017-147173 A | 8/2017 | |
| WO | 2012/164642 A1 | 12/2012 | |
| WO | WO 2012-164642 | * 12/2012 | ........ H01M 10/0562 |
| WO | 2014/157125 A1 | 10/2014 | |

OTHER PUBLICATIONS

Official Communication issued in International Patent Application No. PCT/JP2018/036967, dated Nov. 27, 2018.

Official Communication issued in corresponding Chinese Patent Application No. 201880066573.0, dated Oct. 9, 2022.

* cited by examiner

[FIG. 1]
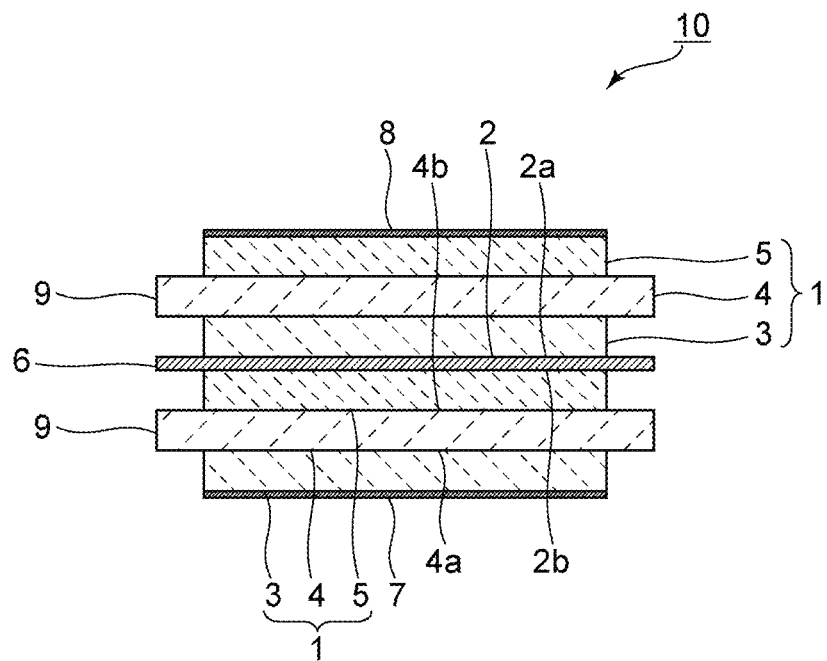
[FIG. 2]
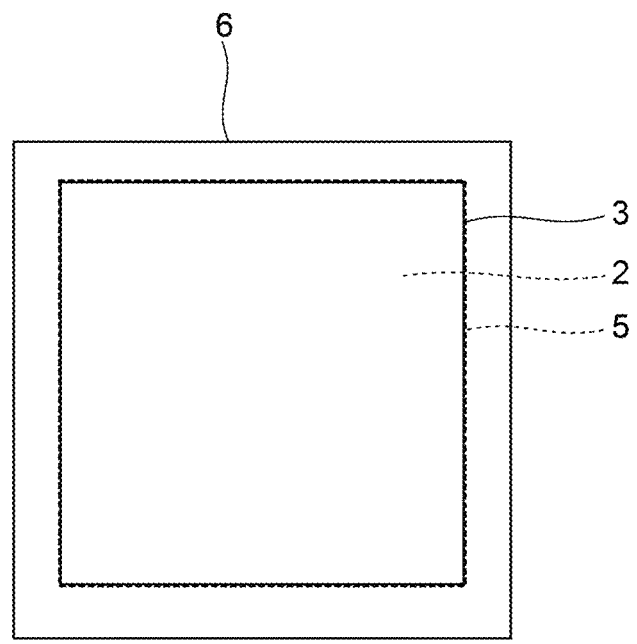

[FIG. 3]
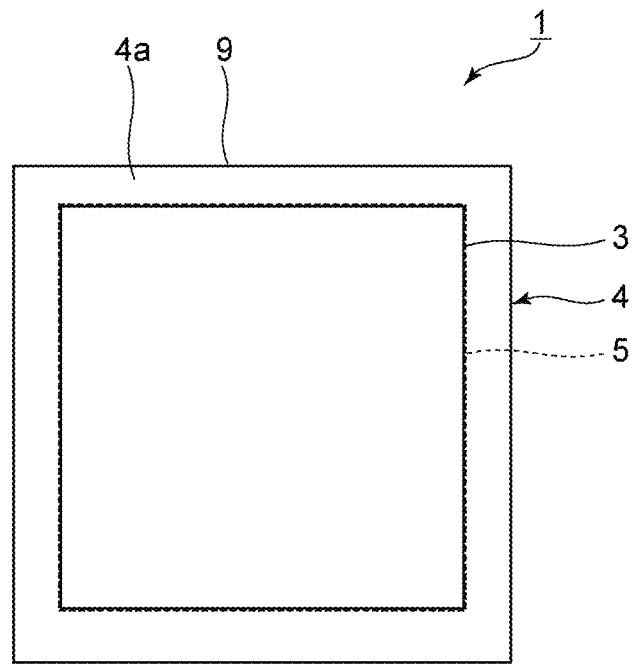
[FIG. 4]
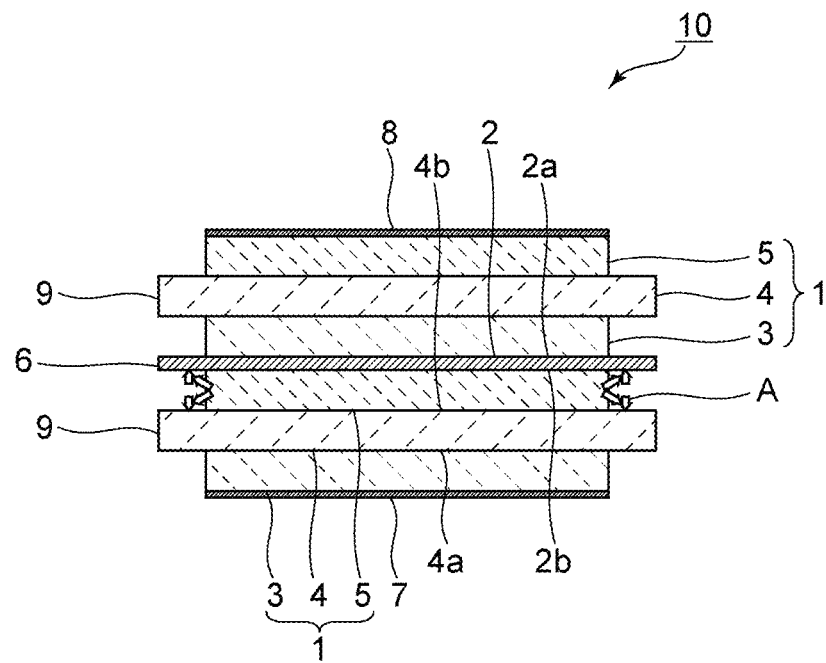

[FIG. 5]
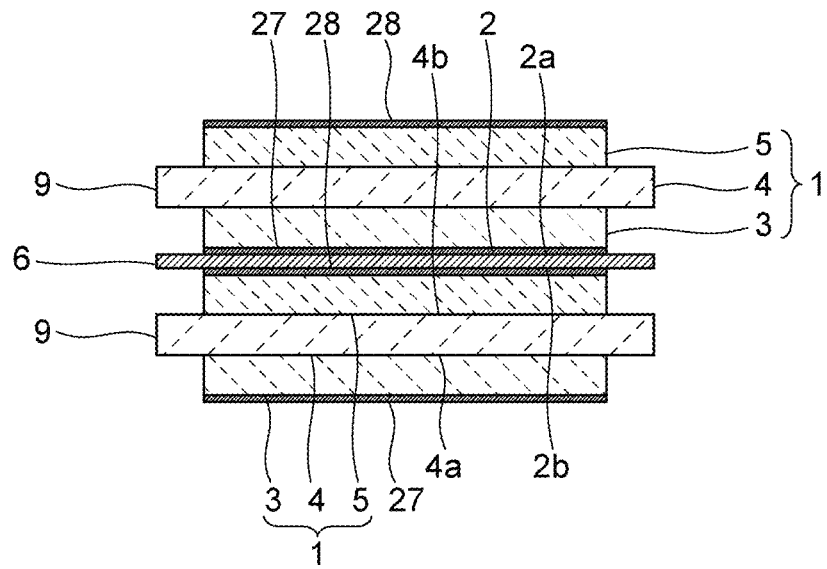
[FIG. 6]
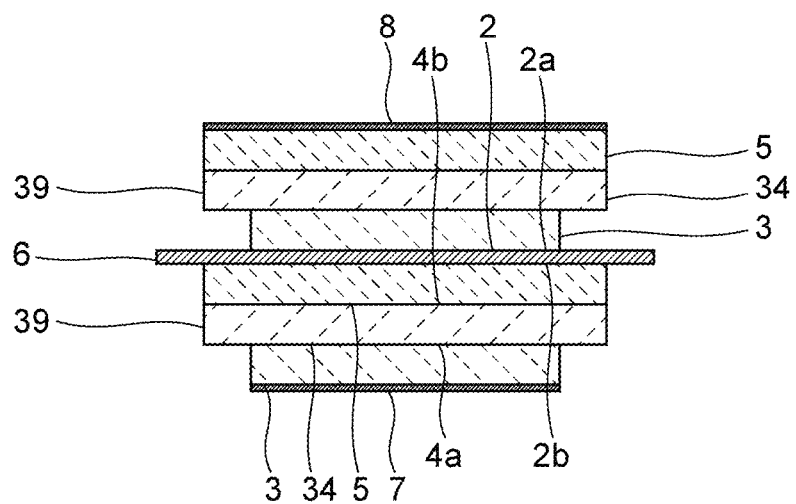

[FIG. 7]
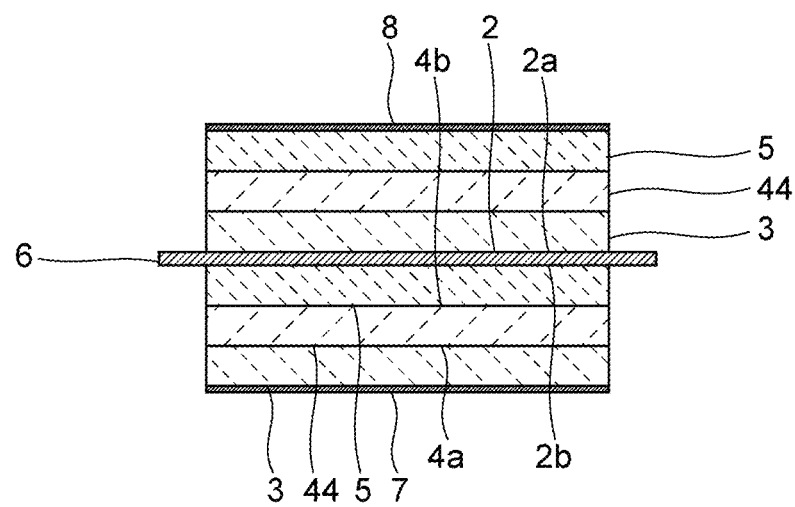
[FIG. 8]
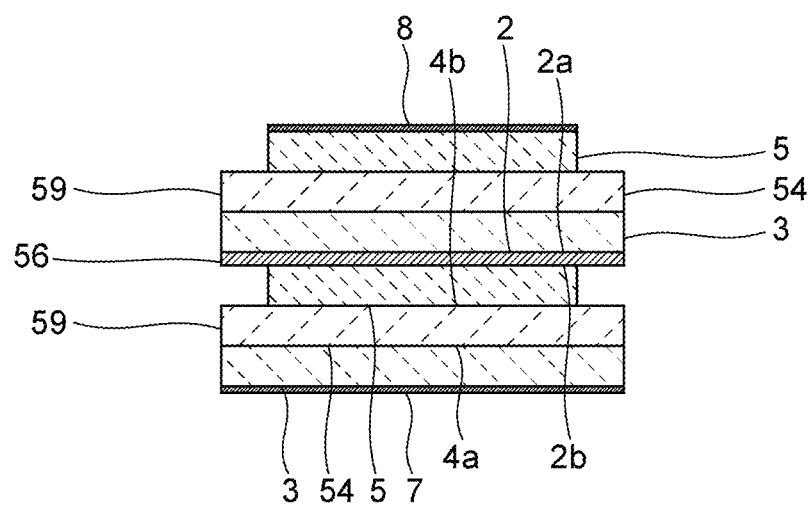

[FIG. 9]
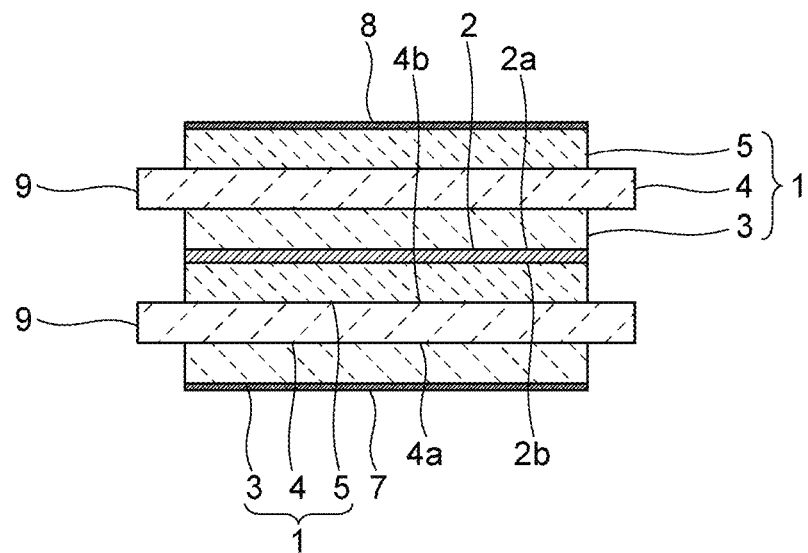
[FIG. 10]
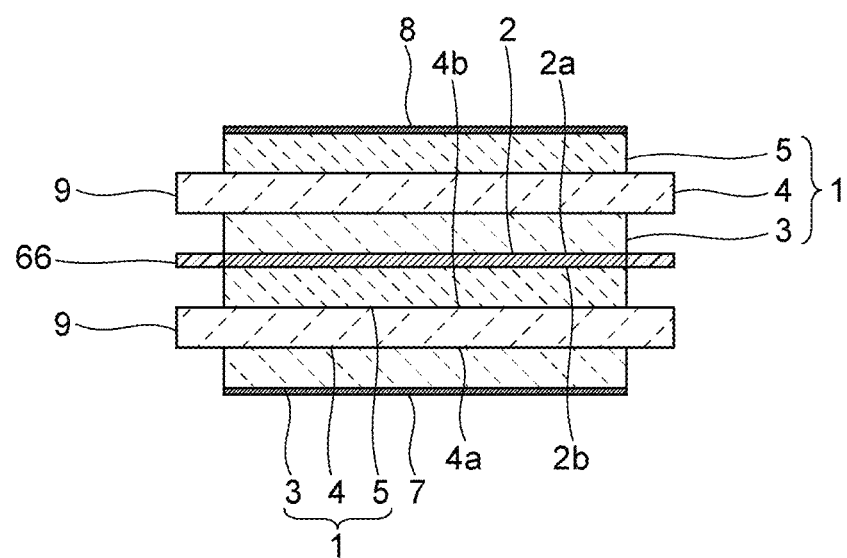

[FIG. 11]
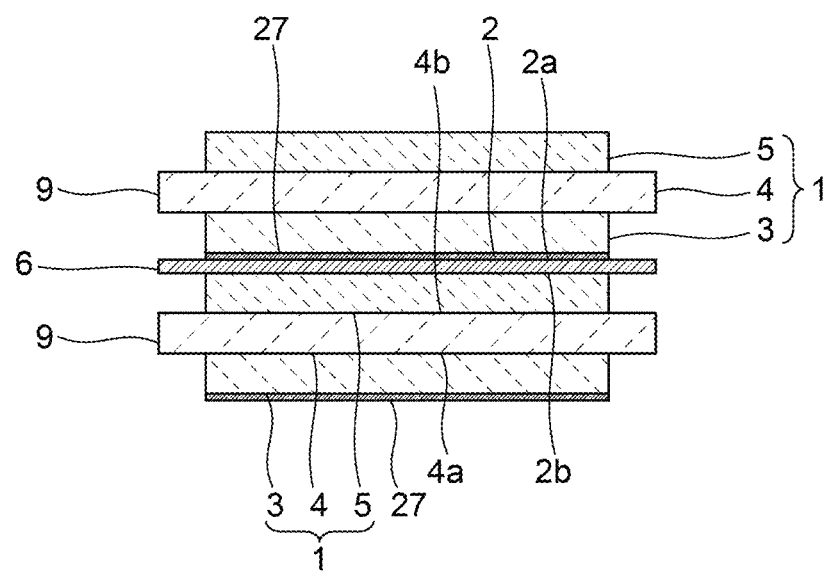
[FIG. 12]
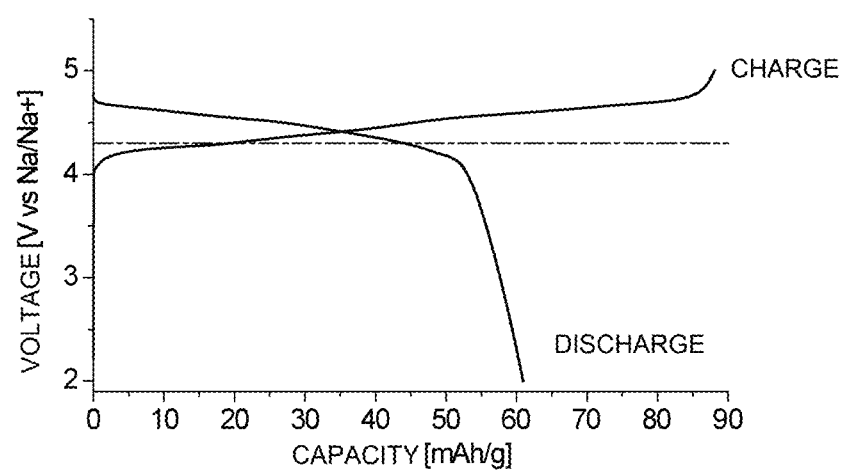

[FIG. 13]
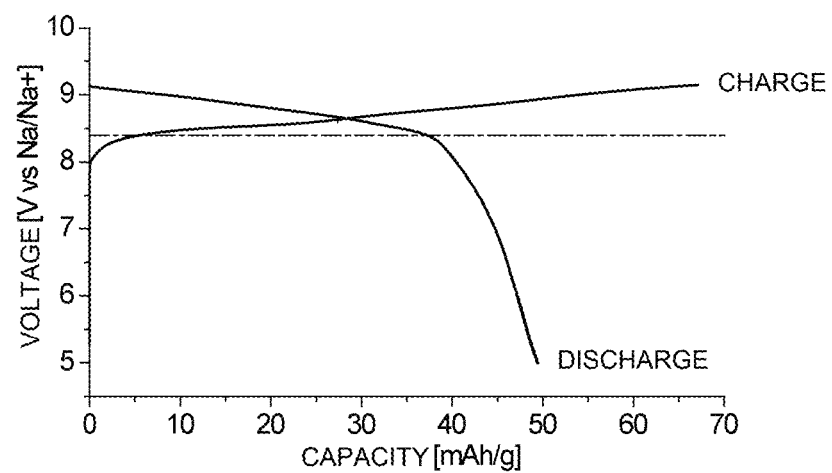
[FIG. 14]
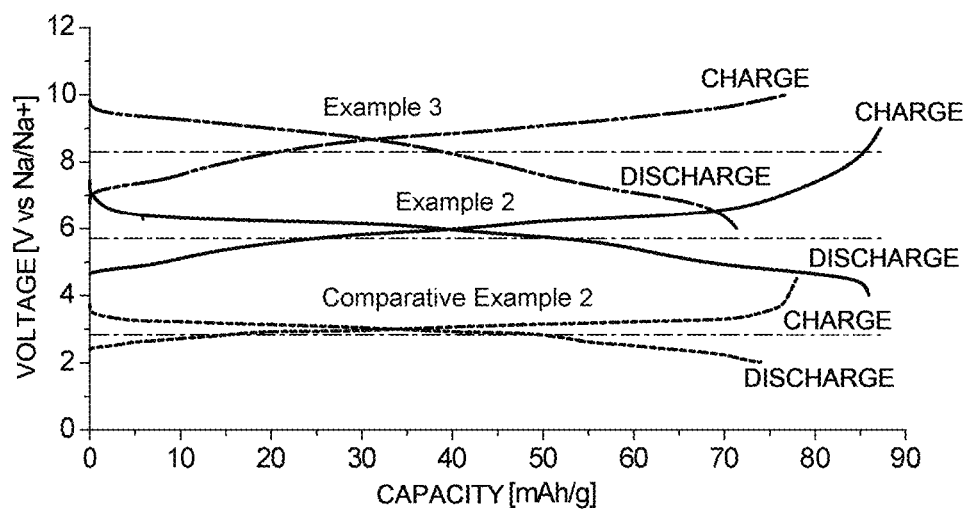

BIPOLAR ALL-SOLID-STATE SODIUM ION SECONDARY BATTERY

TECHNICAL FIELD

The present invention relates to bipolar all-solid-state sodium ion secondary batteries.

BACKGROUND ART

Lithium ion secondary batteries have secured their place as high-capacity and light-weight power sources essential for mobile devices, electric vehicles, and so on. In the current lithium ion secondary batteries, organic electrolytic solutions are mainly used as electrolytes. Therefore, their voltage obtained in the form of a unit battery is as low as about 3.7 V. Hence, in order to obtain a high voltage, a plurality of unit batteries need to be connected in series. However, when a plurality of unit batteries are connected through connecting portions, there arises a problem that electric resistance of the connecting portions causes the voltage to significantly decrease. In addition, because a battery having a connecting portion means that the battery includes a large amount of portion not contributing to the increase in voltage, this presents a problem that the volume energy density and the weight energy density (hereinafter, referred to collectively as the "energy density") decrease.

A bipolar battery has been proposed as a solution to these problems. Patent Literature 1 below discloses, as an example of a bipolar battery, a lithium secondary battery including a polymer electrolyte layer containing an electrolytic solution. This bipolar battery includes power-generating elements in each of which a positive electrode composite material layer, a polymer electrolyte layer, and a negative electrode composite material layer are laid one upon another in this order. The plurality of power-generating elements are connected in series with a current collector layer in between.

Unlike the above, Patent Literature 2 below discloses a secondary battery in which a sulfide-based solid electrolyte is used.

CITATION LIST

Patent Literature

[PTL 1]
JP-A-2002-075455
[PTL 2]
JP-A-2017-147173

SUMMARY OF INVENTION

Technical Problem

In a bipolar battery, positive electrodes and negative electrodes are repeatedly layered in a unit battery. Therefore, in the bipolar battery described in Patent Literature 1, the electrolytic solution may leak from the polymer electrolyte layer, thus causing a short circuit between a positive electrode and a negative electrode. In addition, as a result, the electrolytic solution may be exposed to a high voltage of 4.5 V or more which is a decomposition potential. This creates a safety problem that the electrolytic solution may be decomposed in the battery to produce a gas and the gas may cause the battery to explode and ignite. As just described, the secondary battery has a problem that an increase in voltage may lead to impairment in safety.

On the other hand, with the use of a solid electrolyte as in the secondary battery described in Patent Literature 2, no ignition ever occurs due to the decomposition of an electrolytic solution. However, sulfide-based solid electrolytes have a safety problem that, upon exposure to the air atmosphere, they produce hydrogen sulfide or the like. Because the reactivity between a sulfide-based solid electrolyte and the air atmosphere is high, it is difficult for a secondary battery to block the air atmosphere such that hydrogen sulfide or the like is not produced.

An object of the present invention is to provide a bipolar all-solid-state sodium ion secondary battery that can increase the voltage without impairing safety.

Solution to Problem

A bipolar all-solid-state sodium ion secondary battery according to the present invention includes: a plurality of all-solid-state sodium ion secondary batteries in each of which a positive electrode layer capable of absorbing and releasing sodium, a solid electrolyte layer made of a sodium ion-conductive oxide, and a negative electrode layer capable of absorbing and releasing sodium are laid one upon another in this order; and a current collector layer provided between the positive electrode layer of each of the plurality of all-solid-state sodium ion secondary batteries and the negative electrode layer of the adjacent all-solid-state sodium ion secondary battery and shared by the positive electrode layer and the negative electrode layer.

An extended portion is preferably provided which, in plan view, is continued to an outer peripheral edge of the current collector layer and extends outwardly of an outer peripheral edge of the positive electrode layer and/or an outer peripheral edge of the negative electrode layer. In this case, the extended portion may be made of the same material as the current collector layer. Alternatively, the extended portion may be made of a different material from the current collector layer. More preferably, the extended portion has an area of not less than 1% and not more than 50% of a total area of the extended portion and the current collector layer when viewed in plan.

The solid electrolyte layer preferably has a portion extending outwardly of an outer peripheral edge of the positive electrode layer and/or an outer peripheral edge of the negative electrode layer when viewed in plan. In this case, more preferably, the portion of the solid electrolyte layer extending outwardly of the outer peripheral edge of the positive electrode layer and/or the outer peripheral edge of the negative electrode layer has an area of not less than 1% and not more than 50% of an area of the solid electrolyte layer when viewed in plan.

The current collector layer may be made of at least one selected from the group consisting of aluminum, titanium, silver, copper, stainless steel, alloys containing one or more of the metals, and graphite.

The solid electrolyte layer preferably contains at least one material of β-alumina, β"-alumina, and NASICON crystals.

Advantageous Effects of Invention

The present invention enables provision of a bipolar all-solid-state sodium ion secondary battery that can increase the voltage without impairing safety.

BRIEF DESCRIPTION OF DRAWINGS

FIG. 1 is a schematic cross-sectional view showing a bipolar all-solid-state sodium ion secondary battery according to a first embodiment of the present invention.

FIG. 2 is a schematic plan view showing a portion of the bipolar all-solid-state sodium ion secondary battery according to the first embodiment of the present invention at which two all-solid-state sodium ion secondary batteries are connected through a current collector layer, when viewed from the positive electrode layer side of the portion.

FIG. 3 is a schematic plan view showing the all-solid-state sodium ion secondary battery according to the first embodiment of the present invention when viewed from the positive electrode layer side.

FIG. 4 is a schematic cross-sectional view for illustrating a state where Na dendrites have precipitated from a negative electrode layer in the first embodiment of the present invention.

FIG. 5 is a schematic cross-sectional view showing a bipolar all-solid-state sodium ion secondary battery according to a first modification of the first embodiment of the present invention.

FIG. 6 is a schematic cross-sectional view showing a bipolar all-solid-state sodium ion secondary battery according to a second modification of the first embodiment of the present invention.

FIG. 7 is a schematic cross-sectional view showing a bipolar all-solid-state sodium ion secondary battery according to a third modification of the first embodiment of the present invention.

FIG. 8 is a schematic cross-sectional view showing a bipolar all-solid-state sodium ion secondary battery according to a fourth modification of the first embodiment of the present invention.

FIG. 9 is a schematic cross-sectional view showing a bipolar all-solid-state sodium ion secondary battery according to a fifth modification of the first embodiment of the present invention.

FIG. 10 is a schematic cross-sectional view showing a bipolar all-solid-state sodium ion secondary battery according to a sixth modification of the first embodiment of the present invention.

FIG. 11 is a schematic cross-sectional view showing a bipolar all-solid-state sodium ion secondary battery in Example 1.

FIG. 12 is a graph showing charge and discharge curves of a battery for evaluation in Comparative Example 1.

FIG. 13 is a graph showing charge and discharge curves of a battery for evaluation in Example 1.

FIG. 14 is a graph showing charge and discharge curves of batteries for evaluation in Examples 2 and 3 and Comparative Example 2.

DESCRIPTION OF EMBODIMENTS

Hereinafter, a description will be given of a preferred embodiment. However, the following embodiment is merely illustrative and the present invention is not intended to be limited to the following embodiment. Throughout the drawings, members having substantially the same functions may be referred to by the same reference characters.

First Embodiment

FIG. 1 is a schematic cross-sectional view showing a bipolar all-solid-state sodium ion secondary battery according to a first embodiment of the present invention. As shown in FIG. 1, a bipolar all-solid-state sodium ion secondary battery 10 according to this embodiment includes a plurality of all-solid-state sodium ion secondary batteries 1 and further includes a current collector layer 2 provided between the plurality of all-solid-state sodium ion secondary batteries 1. The plurality of all-solid-state sodium ion secondary batteries 1 are connected in series with the current collector layer 2 in between. The number of all-solid-state sodium ion secondary batteries 1 in the bipolar all-solid-state sodium ion secondary battery 10 is not limited to two and may be three or more.

In each all-solid-state sodium ion secondary battery 1, a positive electrode layer 3 capable of absorbing and releasing sodium, a solid electrolyte layer 4 made of a sodium ion-conductive oxide, and a negative electrode layer 5 capable of absorbing and releasing sodium are laid one upon another in this order. Each current collector layer 2 is shared by the positive electrode layer 3 of one of adjacent two of the plurality of all-solid-state sodium ion secondary batteries 1 and the negative electrode layer 5 of the other of the adjacent all-solid-state sodium ion secondary batteries 1.

The current collector layer 2 has a first principal surface 2a located toward the positive electrode layer 3 and a second principal surface 2b located toward the negative electrode layer 5. The solid electrolyte layer 4 has a third principal surface 4a located toward the positive electrode layer 3 and a fourth principal surface 4b located toward the negative electrode layer 5.

The current collector layer 2 is made of, but not particularly limited to, at least one selected from the group consisting of, for example, aluminum, titanium, silver, copper, stainless steel, alloys containing one or more of the metals, and graphite. In this embodiment, the current collector layer 2 is made of aluminum. The thickness of the current collector layer 2 is not particularly limited, but is 3 μm in this embodiment.

A first metal film 7 for current collection is provided on the positive electrode layer 3 located at one outermost side of the bipolar all-solid-state sodium ion secondary battery 10 in the direction of layering of the all-solid-state sodium ion secondary batteries 1. A second metal film 8 for current collection is provided on the negative electrode layer 5 located at the other outermost side in the above direction of layering. The same material as the current collector layer 2 may be used for the first metal film 7 and the second metal film 8. The first metal film 7 and the second metal film 8 may not necessarily be provided. However, the provision of the first metal film 7 and the second metal film 8 enables efficient current collection.

FIG. 2 is a schematic plan view showing a portion of the bipolar all-solid-state sodium ion secondary battery according to the first embodiment of the present invention at which two all-solid-state sodium ion secondary batteries are connected through the current collector layer 2, when viewed from the positive electrode layer 3 side of the portion. In FIG. 2, the solid electrolyte layer and so on are not given.

As shown in FIG. 2, an extended portion 6 is provided which, in plan view, is continued to the entire outer peripheral edge of the current collector layer 2 and extends outwardly of the outer peripheral edges of both the positive electrode layer 3 and the negative electrode layer 5. The extended portion 6 only has to extend outwardly of at least a portion of the outer peripheral edge of the positive electrode layer 3 and/or the outer peripheral edge of the negative electrode layer 5. The extended portion 6 only has to be continued to at least a portion of the outer peripheral edge of the current collector layer 2. In this embodiment, the current collector layer 2 and the extended portion 6 are provided as a single piece of the same material. The thickness of the extended portion 6 is 3 μm like the current collector layer 2.

The bipolar all-solid-state sodium ion secondary battery 10 may not necessarily include the extended portion 6.

FIG. 3 is a schematic plan view showing the all-solid-state sodium ion secondary battery according to the first embodiment of the present invention when viewed from the positive electrode layer 3 side. As shown in FIG. 3, the solid electrolyte layer 4 has a solid electrolyte layer extended portion 9 which is a portion thereof extending outwardly of the outer peripheral edges of both the positive electrode layer 3 and the negative electrode layer 5 when viewed in plan. The solid electrolyte layer extended portion 9 only has to extend outwardly of at least a portion of the outer peripheral edge of the positive electrode layer 3 and/or the outer peripheral edge of the negative electrode layer 5. The solid electrolyte layer 4 may not necessarily have the solid electrolyte layer extended portion 9.

A feature of this embodiment is that the plurality of all-solid-state sodium ion secondary batteries 1 are connected in series with the current collector layer or layers 2 between them. Thus, the voltage can be efficiently increased. Since a solid electrolyte layer 4 made of a sodium ion-conductive oxide is used in each of the all-solid-state sodium ion secondary batteries 1, ignition or like phenomena due to the decomposition of an electrolytic solution as described previously is less likely to occur and production of harmful gas or the like derived from the reaction of the solid electrolyte with the air atmosphere is less likely to occur. Therefore, the voltage can be efficiently increased without impairing safety.

In the all-solid-state sodium ion secondary batteries 1, during charge, Na dendrites formed of acicular Na crystals may precipitate on the negative electrode layer 5. Repeated charge and discharge may grow the Na dendrites. If Na dendrites precipitate, they are highly likely to precipitate from the side surface of the negative electrode layer 5 free from contact with either of the current collector layer 2 and the solid electrolyte layer 4. If the Na dendrites grow, they may come into contact with the positive electrode layer 3 to cause a short circuit. Unlike the above, in this embodiment, even if Na dendrites grow, a short circuit between the negative electrode layer 5 and the positive electrode layer 3 is less likely to occur. This will be described with reference to FIG. 4 below.

FIG. 4 is a schematic cross-sectional view for illustrating a state where Na dendrites have precipitated from the negative electrode layer in the first embodiment of the present invention.

As shown in FIG. 4, the bipolar all-solid-state sodium ion secondary battery 10 includes an extended portion 6 extending outwardly of the outer peripheral edge of the negative electrode layer 5 when viewed in plan. Thus, even if Na dendrites A grow and develop from the negative electrode layer 5 toward the positive electrode layer 3 of the other all-solid-state sodium ion secondary battery 1 connected through the current collector layer 2 to the negative electrode layer 5, the development of the Na dendrites is blocked by the extended portion 6. Therefore, a short circuit between the all-solid-state sodium ion secondary batteries 1 is less likely to occur. In addition, the extended portion 6 extends outwardly of the outer peripheral edge of the positive electrode layer 3 when viewed in plan. Therefore, even if the Na dendrites A get over the extended portion 6, the distance taken for the Na dendrites A to extend from the negative electrode layer 5 to the positive electrode layer 3 will be long. Hence, a short circuit between the all-solid-state sodium ion secondary batteries 1 is even less likely to occur.

Furthermore, in this embodiment, the solid electrolyte layer 4 includes a solid electrolyte layer extended portion 9 extending outwardly of the outer peripheral edge of the negative electrode layer 5 when viewed in plan. Thus, even if Na dendrites A develop toward the positive electrode layer 3 within the same all-solid-state sodium ion secondary battery 1, the development of the Na dendrites is blocked by the solid electrolyte layer extended portion 9. Therefore, a short circuit between the negative electrode layer 5 and the positive electrode layer 3 within the same all-solid-state sodium ion secondary battery 1 is less likely to occur. In addition, the solid electrolyte layer extended portion 9 extends outwardly of the outer peripheral edge of the positive electrode layer 3 when viewed in plan. Therefore, even if the Na dendrites A get over the extended portion 6, the distance taken for the Na dendrites A to extend from the negative electrode layer 5 to the positive electrode layer 3 will be long. Hence, a short circuit within the same all-solid-state sodium ion secondary battery 1 is even less likely to occur.

The area of the extended portion 6 is, in plan view from the first principal surface 2a of the current collector layer 2, preferably 1% or more, more preferably 3% or more, and particularly preferably 10% or more of the total area of the extended portion 6 and the current collector layer 2. In this case, the distance taken for the Na dendrites A to extend from the negative electrode layer 5 to the positive electrode layer 3 can be made longer. Therefore, the negative electrode layer 5 and the positive electrode layer 3 are even less likely to cause a short circuit therebetween. The area of the extended portion 6 is, in plan view from the second principal surface 2b of the current collector layer 2, preferably 1% or more, more preferably 5% or more, and particularly preferably 15% or more of the total area of the extended portion 6 and the current collector layer 2. In this case, the development of the Na dendrites A can be effectively blocked. Therefore, the negative electrode layer 5 and the positive electrode layer 3 are yet even less likely to cause a short circuit therebetween.

The area of the extended portion 6 is, in plan view from the first principal surface 2a of the current collector layer 2, preferably 50% or less, more preferably 40% or less, and particularly preferably 35% or less of the total area of the extended portion 6 and the current collector layer 2. The area of the extended portion 6 is, in plan view from the second principal surface 2b of the current collector layer 2, preferably 50% or less, more preferably 40% or less, and particularly preferably 35% or less of the total area of the extended portion 6 and the current collector layer 2. If the above area ratio is too large, the bipolar all-solid-state sodium ion secondary battery 10 may be difficult to reduce in size.

The area of the solid electrolyte layer extended portion 9 is, in plan view from the third principal surface 4a of the solid electrolyte layer 4, preferably 1% or more, more preferably 3% or more, and particularly preferably 10% or more of the area of the solid electrolyte layer 4. In this case, the distance taken for the Na dendrites A to extend from the negative electrode layer 5 to the positive electrode layer 3 can be made longer. Therefore, the negative electrode layer 5 and the positive electrode layer 3 are even less likely to cause a short circuit therebetween. The area of the solid electrolyte layer extended portion 9 is, in plan view from the fourth principal surface 4b of the solid electrolyte layer 4, preferably 1% or more, more preferably 5% or more, and particularly preferably 15% or more of the area of the solid electrolyte layer 4. In this case, the development of the Na dendrites A can be effectively blocked. Therefore, the negative electrode layer 5 and the positive electrode layer 3 are yet even less likely to cause a short circuit therebetween.

The area of the solid electrolyte layer extended portion 9 is, in plan view from the third principal surface 4a of the solid electrolyte layer 4, preferably 50% or less, more preferably 40% or less, and particularly preferably 35% or less of the area of the solid electrolyte layer 4. If the above area ratio is too large, the area of the positive electrode layer 3 is small, so that the charge/discharge capacity may not be able to be sufficiently large. The area of the solid electrolyte layer extended portion 9 is, in plan view from the fourth principal surface 4b of the solid electrolyte layer 4, preferably 50% or less, more preferably 40% or less, and particularly preferably 35% or less of the area of the solid electrolyte layer 4. If the above area ratio is too large, the area of the negative electrode layer 5 is small, so that the charge/discharge capacity may not be able to be sufficiently large.

The thickness of the current collector layer 2 is preferably 0.1 µm or more and more preferably 3 µm or more. When the thickness of the current collector layer 2 is in the above range, the occurrence of a short circuit between the positive electrode layer 3 and the negative electrode layer 5 adjacent to each other with the current collector layer 2 in between can be reduced. The thickness of the current collector layer 2 is preferably 50 µm or less and more preferably 15 µm or less. If the current collector layer 2 is too thick, the energy density of the bipolar all-solid-state sodium ion secondary battery 10 tends to decrease.

The thickness of the extended portion 6 is preferably 0.1 µm or more and more preferably 3 µm or more. When the thickness of the extended portion 6 is in the above range, the extended portion 6 is less likely to be broken by Na dendrites A and, therefore, the negative electrode layer 5 and the positive electrode layer 3 are even less likely to cause a short circuit therebetween. The thickness of the extended portion 6 is preferably 50 µm or less and more preferably 15 µm or less. If the extended portion 6 is too thick, the energy density of the bipolar all-solid-state sodium ion secondary battery 10 tends to decrease.

Hereinafter, first to sixth modifications of the first embodiment will be shown. Also in the first to sixth modifications, like the first embodiment, the voltage can be increased without impairing safety and a short circuit is less likely to occur.

FIG. 5 is a schematic cross-sectional view showing a bipolar all-solid-state sodium ion secondary battery according to a first modification of the first embodiment of the present invention. In this modification, a first metal film 27 is provided between the positive electrode layer 3 and the current collector layer 2 and a second metal film 28 is provided between the negative electrode layer 5 and the current collector layer 2.

The thickness of the first metal film 27 is preferably smaller than that of the current collector layer 2. Thus, the surface shape of the first metal film 27 can be easily conformed to the surface shape of the positive electrode layer 3, so that the adhesion between the first metal film 27 and the positive electrode layer 3 can be increased. Likewise, the thickness of the second metal film 28 is preferably smaller than that of the current collector layer 2, in which case the adhesion between the second metal film 28 and the negative electrode layer 5 can be increased. Thus, the current collection efficiency can be efficiently increased. The same material as the current collector layer 2 may be used for the first metal film 27 and the second metal film 28. The first metal film 27 and the second metal film 28 can be provided, for example, by sputtering, vacuum vapor deposition or like processes.

FIG. 6 is a schematic cross-sectional view showing a bipolar all-solid-state sodium ion secondary battery according to a second modification of the first embodiment of the present invention. In this modification, a solid electrolyte layer extended portion 39 of each solid electrolyte layer 34 extends outwardly only of the outer peripheral edge of the positive electrode layer 3 when viewed in plan.

FIG. 7 is a schematic cross-sectional view showing a bipolar all-solid-state sodium ion secondary battery according to a third modification of the first embodiment of the present invention. In this modification, each solid electrolyte layer 44 has no solid electrolyte layer extended portion.

FIG. 8 is a schematic cross-sectional view showing a bipolar all-solid-state sodium ion secondary battery according to a fourth modification of the first embodiment of the present invention. In this modification, an extended portion 56 and a solid electrolyte layer extended portion 59 of each solid electrolyte layer 54 extend outwardly only of the outer peripheral edge of the negative electrode layer 5 when viewed in plan.

FIG. 9 is a schematic cross-sectional view showing a bipolar all-solid-state sodium ion secondary battery according to a fifth modification of the first embodiment of the present invention. In this modification, no extended portion continued to the outer peripheral edge of the current collector layer 2 is provided.

FIG. 10 is a schematic cross-sectional view showing a bipolar all-solid-state sodium ion secondary battery according to a sixth modification of the first embodiment of the present invention. In this modification, the current collector layer 2 and its extended portion 66 are made of different materials. The extended portion 66 may be made of an appropriate metal or made of an appropriate resin, ceramic or the like.

Hereinafter, a description will be given of details of the solid electrolyte layer 4, the positive electrode layer 3, and the negative electrode layer 5 each of which is used in the bipolar all-solid-state sodium ion secondary battery 10 according to this embodiment.

(Solid Electrolyte Layer)

In this embodiment, the solid electrolyte layer 4 is made of a sodium ion-conductive oxide. Examples of the sodium ion-conductive oxide include compounds containing: at least one selected from the group consisting of Al, Y, Zr, Si, and P; Na; and O, and specific examples thereof include β-alumina, β"-alumina, and NASICON crystals. These materials are preferably used because they have excellent sodium ion conductivity.

Examples of the oxide material containing β-alumina or β"-alumina include those containing, in terms of % by mole, 65% to 98% $Al_2O_3$, 2% to 20% $Na_2O$, and 0.3% to 15% $MgO+Li_2O$. Reasons why the composition is limited as above will be described below. Note that in the following description "%" refers to "% by mole" unless otherwise stated. Furthermore, "(component)+(component)+ . . . " means the total sum of the contents of the relevant components.

$Al_2O_3$ is a main component of β-alumina or β"-alumina. The content of $Al_2O_3$ is preferably 65% to 98% and particularly preferably 70% to 95%. If $Al_2O_3$ is too little, ionic conductivity is likely to decrease. On the other hand, if $Al_2O_3$ is too much, α-alumina, which has no ionic conductivity, remains, so that the ionic conductivity is likely to decrease.

Na$_2$O is a component that gives sodium ion conductivity to the solid electrolyte layer 4. The content of Na$_2$O is preferably 2% to 20%, more preferably 3% to 18%, and particularly preferably 4% to 16%. If Na$_2$O is too little, the above effect is less likely to be achieved. On the other hand, if Na$_2$O is too much, surplus sodium forms compounds not contributing to ionic conductivity, such as NaAlO$_2$, so that the ionic conductivity is likely to decrease.

MgO and Li$_2$O are components (stabilizers) that stabilize the structures of β-alumina and β"-alumina. The content of MgO+Li$_2$O is preferably 0.3% to 15%, more preferably 0.5% to 10%, and particularly preferably 0.8% to 8%. If MgO+Li$_2$O is too little, alpha-alumina remains in the solid electrolyte layer 4, so that the ionic conductivity is likely to decrease. On the other hand, if MgO+Li$_2$O is too much, MgO or Li$_2$O having failed to function as a stabilizer remains in the solid electrolyte layer 4, so that the ionic conductivity is likely to decrease.

The solid electrolyte layer 4 preferably contains, in addition to the above components, ZrO$_2$ or Y$_2$O$_3$. ZrO$_2$ and Y$_2$O$_3$ have the effect of suppressing abnormal grain growth of β-alumina and/or β"-alumina during firing of raw materials to produce a solid electrolyte layer 4 and thus increasing the adhesion of particles of β-alumina and/or β"-alumina. The content of ZrO$_2$ is preferably 0% to 15%, more preferably 1% to 13%, and particularly preferably 2% to 10%. The content of Y$_2$O$_3$ is preferably 0% to 5%, more preferably 0.01% to 4%, and particularly preferably 0.02% to 3%. If ZrO$_2$ or Y$_2$O$_3$ is too much, the amount of β-alumina and/or β"-alumina produced decreases, so that the ionic conductivity is likely to decrease.

Examples of the NASICON crystals include those containing crystals represented by a general formula Na$_s$A1$_t$A2$_u$O$_v$ (where A1 is at least one selected from Al, Y, Yb, Nd, Nb, Ti, Hf, and Zr, A2 is at least one selected from Si and P, s=1.4 to 5.2, t=1 to 2.9, u=2.8 to 4.1, and v=9 to 14). In a preferred form of the above crystals, Al is at least one selected from Y, Nb, Ti, and Zr, s=2.5 to 3.5, t=1 to 2.5, u=2.8 to 4, and v=9.5 to 12. By doing so, crystals having excellent ionic conductivity can be obtained. Particularly, monoclinic or trigonal NASICON crystals are preferred because they have excellent ionic conductivity.

Specific examples of the crystal represented by the above general formula Na$_s$A1$_t$A2$_u$O$_v$ include Na$_3$Zr$_2$Si$_2$PO$_{12}$, Na$_{3.2}$Zr$_{1.3}$Si$_{2.2}$P$_{0.8}$O$_{10.5}$, Na$_3$Zr$_{1.6}$Ti$_{0.4}$Si$_2$PO$_{12}$, Na$_3$Hf$_2$Si$_2$PO$_{12}$, Na$_{3.4}$Zr$_{9.9}$Hf$_{1.4}$Al$_{0.6}$Si$_{1.2}$P$_{1.8}$O$_{12}$, Na$_3$Zr$_{1.7}$Nb$_{0.24}$Si$_2$PO$_{12}$, Na$_{3.6}$Ti$_{0.2}$Y$_{0.8}$Si$_{2.8}$O$_9$, Na$_3$Zr$_{1.88}$Y$_{0.12}$Si$_2$PO$_{12}$, Na$_{3.12}$Zr$_{1.88}$Y$_{0.12}$Si$_2$PO$_{12}$, and Na$_{3.6}$Zr$_{0.13}$Yb$_{1.67}$Si$_{0.11}$P$_{2.9}$O$_{12}$.

The thickness of the solid electrolyte layer 4 is preferably in a range of 10 μm to 2000 μm and more preferably in a range of 50 μm to 200 μm. If the thickness of the solid electrolyte layer 4 is too small, the mechanical strength decreases, so that the solid electrolyte layer 4 is liable to breakage. In addition, an internal short circuit is likely to develop. If the thickness of the solid electrolyte layer 4 is too large, the distance of ion conduction accompanying charge and discharge becomes long and the internal resistance therefore becomes high, so that the discharge capacity and the operating voltage are likely to decrease. In addition, the energy density of the bipolar all-solid-state sodium ion secondary battery 10 tends to decrease.

The solid electrolyte layer 4 can be produced by mixing raw material powders, forming the mixed raw material powders into a shape, and then firing them. For example, the solid electrolyte layer 4 can be produced by making the raw material powders into a slurry, forming a green sheet from the slurry, and then firing the green sheet. Alternatively, the solid electrolyte layer 4 may be produced by the sol-gel method.

(Positive Electrode Layer)

No particular limitation is placed on the type of the positive electrode layer 3 in this embodiment so long as it contains a positive-electrode active material capable of absorbing and releasing sodium and functions as a positive electrode layer 3. For example, the positive electrode layer 3 may be formed by firing an active material precursor powder, such as a glass powder. When the active material precursor powder is fired, active material crystals precipitate and these active material crystals function as a positive-electrode active material.

Examples of the active material crystals functioning as a positive-electrode active material include sodium transition metal phosphate crystals containing Na, M (where M represents at least one transition metal element selected from Cr, Fe, Mn, Co, V, and Ni), P, and O. Specific examples include Na$_2$FeP$_2$O$_7$, NaFePO$_4$, Na$_3$V$_2$(PO$_4$)$_3$, Na$_2$NiP$_2$O$_7$, Na$_{3.64}$Ni$_{2.18}$(P$_2$O$_7$)$_2$, Na$_3$Ni$_3$(PO$_4$)$_2$(P$_2$O$_7$), Na$_2$CoP$_2$O$_7$, and Na$_{3.64}$Co$_{2.18}$(P$_2$O$_7$)$_2$. These sodium transition metal phosphate crystals are preferred because they have high capacities and excellent chemical stability.

Preferred among them are triclinic crystals belonging to space group P1 or P−1 and particularly preferred are crystals represented by a general formula Na$_a$M$_y$P$_2$O$_z$ (where 1.2≤x≤2.8, 0.95≤y≤1.6, and 6.5≤z≤8), because these crystals have excellent cycle characteristics. Other active material crystals functioning as a positive-electrode active material include layered sodium transition metal oxide crystals, such as NaCrO$_2$, Na$_{0.7}$MnO$_2$, and NaFe$_{0.2}$Mn$_{0.4}$Ni$_{0.4}$O$_2$. The positive-electrode active material crystals contained in the positive electrode layer may be in a single phase in which a single type of crystals precipitate, or may be in the form of mixed crystals in which a plurality of types of crystals precipitate.

Examples of the active material precursor powder include those containing (i) at least one transition metal element selected from Cr, Fe, Mn, Co, Ni, Ti, and Nb, (ii) at least one element selected from P, Si, and B, and (iii) O.

Examples of the positive-electrode active material precursor powder include, particularly, those containing at least one of a phosphate, a silicate, and a borate and capable of absorbing and releasing sodium and, specifically, those containing, in terms of % by mole of oxide, 8% to 55% Na$_2$O, 10% to 70% CrO+FeO+MnO+CoO+NiO, and 15% to 70% P$_2$O$_5$+SiO$_2$+B$_2$O$_3$. Reasons why each of the components is limited as above will be described below. Note that in the following description of the content of each component "%" refers to "% by mole" unless otherwise stated.

Na$_2$O serves, during charge and discharge, as a supply source of sodium ions that move between the positive-electrode active material and a negative-electrode active material. The content of Na$_2$O is preferably 8% to 55%, more preferably 15% to 45%, and particularly preferably 25% to 35%. If Na$_2$O is too little, the amount of sodium ions contributing to the absorption and release becomes small, so that the discharge capacity tends to decrease. On the other hand, if Na$_2$O is too much, other crystals not contributing to charge and discharge, such as Na$_3$PO$_4$, become likely to precipitate, so that the discharge capacity tends to decrease.

CrO, FeO, MnO, CoO, and NiO are components that change the valence of each transition element during charge and discharge to cause a redox reaction and thus act as a drive force for absorption and release of sodium ions.

Among them, NiO and MnO have a significant effect of increasing the redox potential. Furthermore, FeO is particularly likely to stabilize the structure during charge and discharge and therefore likely to improve the cycle characteristics. The content of CrO+FeO+MnO+CoO+NiO is preferably 10% to 70%, more preferably 15% to 60%, even more preferably 20% to 55%, still more preferably 23% to 50%, yet still more preferably 25% to 40%, and particularly preferably 26% to 36%. If CrO+FeO+MnO+CoO+NiO is too little, the redox reaction accompanying charge and discharge becomes less likely to occur and the amount of sodium ions to be absorbed and released therefore becomes small, so that the discharge capacity tends to decrease. On the other hand, if CrO+FeO+MnO+CoO+NiO is too much, other crystals precipitate, so that the discharge capacity tends to decrease.

$P_2O_5$, $SiO_2$, and $B_2O_3$ each form a three-dimensional network and, therefore, have the effect of stabilizing the structure of the positive-electrode active material. Particularly, $P_2O_5$ and $SiO_2$ are preferred because they have excellent sodium ion conductivity, and $P_2O_5$ is most preferred. The content of $P_2O_5+SiO_2+B_2O_3$ is preferably 15% to 70%, more preferably 20% to 60%, and particularly preferably 25% to 45%. If $P_2O_5+SiO_2+B_2O_3$ is too little, the discharge capacity tends to decrease after repeated charge and discharge. On the other hand, if $P_2O_5+SiO_2+B_2O_3$ is too much, other crystals not contributing to charge and discharge, such as $P_2O_5$, tend to precipitate. The content of each of $P_2O_5$, $SiO_2$, and $B_2O_3$ components is preferably 0% to 70%, more preferably 15% to 70%, still more preferably 20% to 60%, and particularly preferably 25% to 45%.

Furthermore, in addition to the above components, various components can be incorporated into the positive-electrode active material so long as not impairing the effects as the positive-electrode active material, so that vitrification can be facilitated. Examples of such components include, in terms of oxides, MgO, CaO, SrO, BaO, ZnO, CuO, $Al_2O_3$, $GeO_2$, $Nb_2O_5$, $TiO_2$, $ZrO_2$, $V_2O_5$, and $Sb_2O_5$. Particularly, $Al_2O_3$ acting as a network forming oxide and $V_2O_5$ serving as an active material component are preferred. The content of the above components is, in total, preferably 0% to 30%, more preferably 0.1% to 20%, and particularly preferably 0.5% to 10%.

The preferred positive-electrode active material precursor powder is one capable of forming an amorphous phase together with positive-electrode active material crystals when subjected to firing. When an amorphous phase is formed, the sodium ion conductivity through the positive electrode layer 3 and at the interface between the positive electrode layer 3 and the solid electrolyte layer 4 can be improved.

The average particle diameter of the active material precursor powder is preferably 0.01 µm to 15 µm, more preferably 0.05 µm to 12 µm, and particularly preferably 0.1 µm to 10 µm. If the average particle diameter of the active material precursor powder is too small, the cohesion between the active material precursor powder increases, so that the active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the positive electrode layer 3 is preferably in a range of 3 µm to 300 µm and more preferably in a range of 10 µm to 150 µm. If the thickness of the positive electrode layer 3 is too small, the capacity of the bipolar all-solid-state sodium ion secondary battery 10 itself becomes small, so that the energy density tends to decrease. If the thickness of the positive electrode layer 3 is too large, the resistance to electron conduction becomes high, so that the discharge capacity and the operating voltage tend to decrease.

The positive electrode layer 3 may contain, if necessary, a solid electrolyte powder. The solid electrolyte powder that can be used is a powder of the same material as the above-described solid electrolyte layer 4. When the positive electrode layer contains the solid electrolyte powder, the sodium ion conductivity through the positive electrode layer 3 and at the interface between the positive electrode layer 3 and the solid electrolyte layer 4 can be improved. The average particle diameter of the solid electrolyte powder is preferably 0.01 µm to 15 µm, more preferably 0.05 µm to 10 µm, and still more preferably 0.1 µm to 5 µm. If the average particle diameter of the solid electrolyte powder is too large, the distance taken to conduct sodium ions becomes long, so that the sodium ion conductivity tends to decrease. In addition, the sodium ion conducting path between the positive-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction with carbon dioxide may occur, so that the sodium ion conductivity is likely to decrease. In addition, voids are likely to be formed, so that the electrode density is likely to decrease. As a result, the discharge capacity tends to decrease.

The volume ratio between the active material precursor powder and the solid electrolyte powder is preferably 20:80 to 95:5, more preferably 30:70 to 90:10, and particularly preferably 35:65 to 88:12.

Furthermore, the positive electrode layer 3 may contain, if necessary, a conductive agent, such as carbon powder. When a conductive agent is contained in the positive electrode layer 3, the internal resistance of the positive electrode layer 3 can be decreased. The conductive agent is preferably contained in a proportion of 0% to 20% by mass in the positive electrode layer 3 and more preferably contained in a proportion of 1% to 10% by mass.

(Negative Electrode Layer)

No particular limitation is placed on the type of the negative electrode layer 5 so long as it contains a negative-electrode active material capable of absorbing and releasing sodium and functions as a negative electrode layer. The negative-electrode active material may be formed, for example, by firing a negative-electrode active material precursor powder, such as a glass powder. When the negative-electrode active material precursor powder is fired, negative-electrode active material crystals precipitate and these negative-electrode active material crystals function as a negative-electrode active material.

Examples of the negative-electrode active material crystals functioning as a negative-electrode active material include: crystals containing at least one selected from Nb and Ti, and O; metallic crystals of at least one selected from Sn, Bi, and Sb; and alloy crystals containing at least one selected from Sn, Bi, and Sb.

The crystals containing at least one selected from Nb and Ti, and O are preferred because they have excellent cycle characteristics. If the crystals containing at least one selected from Nb and Ti, and O further contain Na and/or Li, this is preferred because the charge/discharge efficiency (the proportion of discharge capacity to charge capacity) increases and a high charge/discharge capacity can be thus maintained. Above all, if the crystals containing at least one selected from Nb and Ti, and O are orthorhombic, hexagonal, cubic or monoclinic crystals, particularly monoclinic crystals belonging to space group $P2_1/m$, this is more preferred because a capacity decrease is less likely to occur even during charge and discharge at a large current.

An example of the orthorhombic crystals is $NaTi_2O_4$. Examples of the hexagonal crystals include $Na_2TiO_3$, $NaTi_8O_{13}$, $NaTiO_2$, $LiNbO_3$, $LiNbO_2$, $Li_7NbO_6$, and $Li_2Ti_3O_7$. Examples of the cubic crystals include $Na_2TiO_3$, $NaNbO_3$, $Li_4Ti_5O_{12}$, and $Li_3NbO_4$. Examples of the monoclinic crystals include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Li_{1.7}Nb_2O_5$, $Li_{1.9}Nb_2O_5$, $Li_{12}Nb_{13}O_{33}$, and $LiNb_3O_8$. An example of the monoclinic crystals belonging to space group $P2_1/m$ is $Na_2Ti_3O_7$.

The crystals containing at least one selected from Nb and Ti, and O preferably further contains at least one selected from B, Si, P, and Ge. These components have the effect of facilitating the formation of an amorphous phase together with the negative-electrode active material crystals and further increasing the sodium ion conductivity.

Other negative-electrode active materials that can be used include Na metal crystals, alloy crystals containing at least Na (for example, Na—Sn alloy and Na—In alloy), metallic crystals of at least one selected from Sn, Bi, and Sb, alloy crystals containing at least one selected from Sn, Bi, and Sb (for example, Sn—Cu alloy, Bi—Cu alloy, and Bi—Zn alloy), and glasses containing at least one selected from Sn, Bi, and Sb. These materials are preferred because they have high capacity and they are less likely to cause a capacity decrease even during charge and discharge at a large current.

Examples of the negative-electrode active material precursor powder include, particularly, those containing at least one of a phosphate, a silicate, and a borate and capable of absorbing and releasing sodium and, specifically, those containing, in terms of % by mole of oxide, 0% to 90% SnO, 0% to 90% $Bi_2O_3$, 0% to 90% $TiO_2$, 0% to 90% $Fe_2O_3$, 0% to 90% $Nb_2O_5$, 5% to 75% $SiO_2+B_2O_3+P_2O_5$, and 0% to 80% $Na_2O$. With the above composition, a structure is formed in which Sn ions, Bi ions, Ti ions, Fe ions or Nb ions each serving as a negative-electrode active material component are homogeneously dispersed in an oxide matrix containing Si, B or P. Furthermore, when containing $Na_2O$, the negative-electrode active material precursor powder becomes a material having more excellent sodium ion conductivity. As a result, a negative-electrode active material can be obtained which can suppress a volume change during absorption and release of sodium ions and has more excellent cycle characteristics.

Reasons why the composition of the negative-electrode active material precursor powder is limited as above will be described below. Note that in the following description "%" refers to "% by mole" unless otherwise stated. Furthermore, "(component)+(component)+ . . . " means the total sum of the contents of the relevant components.

SnO, $Bi_2O_3$, $TiO_2$, $Fe_2O_3$, and $Nb_2O_5$ are negative-electrode active material components serving as sites where alkali ions are absorbed and released. When the negative-electrode active material precursor powder contains any of these components, the discharge capacity of the negative-electrode active material per unit mass becomes larger and the charge/discharge efficiency (the proportion of discharge capacity to charge capacity) at the first charge and discharge is more likely to increase. However, if the content of these components is too large, the volume change due to absorption and release of sodium ions during charge and discharge becomes unable to be reduced, so that the cycle characteristics tend to decrease. In view of the above circumstances, the respective preferred ranges of contents of the above components are as follows.

The content of SnO is preferably 0% to 90%, more preferably 45% to 85%, still more preferably 55% to 75%, and particularly preferably 60% to 72%.

The content of $Bi_2O_3$ is preferably 0% to 90%, more preferably 10% to 70%, still more preferably 15% to 65%, and particularly preferably 25% to 55%.

The content of $TiO_2$ is preferably 0% to 90%, more preferably 5% to 72%, even more preferably 10% to 68%, still more preferably 12% to 58%, yet still more preferably 15% to 49%, and particularly preferably 15% to 39%.

The content of $Fe_2O_3$ is preferably 0% to 90%, more preferably 15% to 85%, still more preferably 20% to 80%, and particularly preferably 25% to 75%.

The content of $Nb_2O_5$ is preferably 0% to 90%, more preferably 7% to 79%, even more preferably 9% to 69%, still more preferably 11% to 59%, yet still more preferably 13% to 49%, and particularly preferably 15% to 39%. Note that $SnO+Bi_2O_3+TiO_2+Fe_2O_3+Nb_2O_5$ is preferably 0% to 90%, more preferably 5% to 85%, and particularly preferably 10% to 80%.

$SiO_2$, $B_2O_3$, and $P_2O_5$ are network forming oxides and have the effect of surrounding sodium-ion absorption and release sites in the above negative-electrode active material components to further increase the cycle characteristics. Among them, $SiO_2$ and $P_2O_5$ not only further increase the cycle characteristics but also have excellent sodium ion conductivity, and therefore have the effect of further increasing the rate characteristic.

$SiO_2+B_2O_3+P_2O_5$ is preferably 5% to 85%, more preferably 6% to 79%, even more preferably 7% to 69%, still more preferably 8% to 59%, yet still more preferably 9% to 49%, and particularly preferably 10% to 39%. If $SiO_2+B_2O_3+P_2O_5$ is too little, the volume change of the negative-electrode active material components due to absorption and release of sodium ions during charge and discharge becomes unable to be reduced, so that a structural collapse occurs and, thus, the cycle characteristics is likely to decrease. On the other hand, if $SiO_2+B_2O_3+P_2O_5$ is too much, the content of the negative-electrode active material components becomes relatively small, so that the charge/discharge capacity of the negative-electrode active material per unit mass tends to be small.

The respective preferred ranges of contents of $SiO_2$, $B_2O_3$, and $P_2O_5$ are as follows.

The content of $SiO_2$ is preferably 0% to 75%, more preferably 5% to 75%, even more preferably 7% to 60%, still more preferably 10% to 50%, yet still more preferably 12% to 40%, and particularly preferably 20% to 35%. If the content of $SiO_2$ is too large, the discharge capacity is likely to decrease.

The content of $P_2O_5$ is preferably 5% to 75%, more preferably 7% to 60%, still more preferably 10% to 50%, yet still more preferably 12% to 40%, and particularly preferably 20% to 35%. If the content of $P_2O_5$ is too small, the above effects are less likely to be achieved. On the other hand, if the content of $P_2O_5$ is too large, the discharge capacity is likely to decrease and the water resistance is likely to decrease. In addition, upon preparation of an aqueous electrode paste, undesirable other crystals are produced to thus break the $P_2O_5$ network, so that the cycle characteristics are likely to decrease.

The content of $B_2O_3$ is preferably 0% to 75%, more preferably 5% to 75%, even more preferably 7% to 60%, still more preferably 10% to 50%, yet still more preferably 12% to 40%, and particularly preferably 20% to 35%. If the content of $B_2O_3$ is too large, the discharge capacity is likely to decrease and the chemical durability is likely to decrease.

The preferred negative-electrode active material precursor powder is one capable of forming an amorphous phase together with negative-electrode active material crystals when subjected to firing. When an amorphous phase is formed, the sodium ion conductivity through the negative electrode layer 5 and at the interface between the negative electrode layer 5 and the solid electrolyte layer 4 can be improved.

The average particle diameter of the negative-electrode active material precursor powder is preferably 0.01 μm to 15 μm, more preferably 0.05 μm to 12 μm, and particularly preferably 0.1 μm to 10 μm. If the average particle diameter of the negative-electrode active material precursor powder is too small, the cohesion between the negative-electrode active material precursor powder increases, so that the negative-electrode active material precursor powder tends to be poor in dispersibility when made in paste form. As a result, the internal resistance of the battery becomes high, so that the operating voltage is likely to decrease. In addition, the electrode density decreases, so that the battery capacity per unit volume tends to decrease. On the other hand, if the average particle diameter of the negative-electrode active material precursor powder is too large, sodium ions are less likely to diffuse and the internal resistance tends to be high. In addition, the electrode tends to be poor in surface smoothness.

In the present invention, the average particle diameter means D50 (a volume-based average particle diameter) and refers to a value measured by the laser diffraction/scattering method.

The thickness of the negative electrode layer 5 is preferably in a range of 0.3 μm to 300 μm and more preferably in a range of 3 μm to 150 μm. If the thickness of the negative electrode layer 5 is too small, the absolute capacity (mAh) of the negative electrode tends to decrease. If the thickness of the negative electrode layer 5 is too large, the resistance becomes high, so that the capacity (mAh/g) tends to decrease.

The negative electrode layer 5 may contain a solid electrolyte powder, a conductive agent, and so on. When the negative electrode layer 5 contains the solid electrolyte powder and is thus made of a negative electrode composite material, the contact interface between the negative-electrode active material and the solid electrolyte powder increases to facilitate the absorption and release of sodium ions during charge and discharge, so that the rate characteristic can be further improved.

The solid electrolyte powder that can be used is a powder of the same material as the above-described solid electrolyte layer 4. The average particle diameter of the solid electrolyte powder is preferably 0.01 μm to 15 μm, more preferably 0.05 μm to 10 μm, and particularly preferably 0.1 μm to 5 μm.

If the average particle diameter of the solid electrolyte powder is too large, the distance taken to conduct sodium ions becomes long, so that the sodium ion conductivity tends to decrease. In addition, the sodium ion conducting path between the negative-electrode active material powder and the solid electrolyte powder tends to reduce. As a result, the discharge capacity is likely to decrease. On the other hand, if the average particle diameter of the solid electrolyte powder is too small, degradation due to elution of sodium ions and reaction with carbon dioxide may occur, so that the sodium ion conductivity is likely to decrease. In addition, voids are likely to be formed, so that the electrode density is likely to decrease. As a result, the discharge capacity tends to decrease.

The volume ratio between the negative-electrode active material precursor powder and the solid electrolyte powder is preferably 20:80 to 95:5, more preferably 30:70 to 90:10, and particularly preferably 35:65 to 88:12.

An example of the conductive agent is carbon powder. When a conductive agent is contained in the negative electrode layer 5, the internal resistance of the negative electrode layer 5 can be decreased. The conductive agent is preferably contained in a proportion of 0% to 20% by mass in the negative electrode layer 5 and more preferably contained in a proportion of 1% to 10% by mass.

EXAMPLES

Hereinafter, a description will be given of the present invention with reference to its examples, but the present invention is not limited to these examples.

Example 1

(1-a) Production of Solid Electrolyte
(1-a-1) Preparation of Solid Electrolyte Powder Using sodium carbonate ($Na_2CO_3$), sodium hydrogen carbonate ($NaHCO_3$), magnesium oxide (MgO), aluminum oxide ($Al_2O_3$), zirconium oxide ($ZrO_2$), and yttrium oxide ($Y_2O_3$), powders of these raw materials were formulated to give a composition of, in terms of % by mole, 14.2% $Na_2O$, 5.5% MgO, 75.4% $Al_2O_3$, 4.7% $ZrO_2$, and 0.2% $Y_2O_3$. The raw material powders were formed into a shape by uniaxial pressing at 40 MPa using a 20 mm diameter die and then fired at 1600° C. for 30 minutes, thus obtaining β"-alumina. The handling of the fired β"-alumina was performed in an atmosphere having a dew point minus 40° C. or below.

The obtained β"-alumina was ground with an alumina pestle in an aluminum mortar and the ground product was passed through a mesh with 300-μm openings. The powder having passed through the mesh was further ground, with a "planetary ball mill P6" manufactured by Fritsch GmbH and loaded with 5-mm diameter YTZ (yttria-stabilized zirconia) balls, at 300 rpm for 30 minutes (with a 15-minute pause every 15 minutes), and then passed through a mesh with 20-μm openings. Thereafter, the powder was air-classified with an air classifier ("type MDS-1" manufactured by Nippon Pneumatic Mfg. Co., Ltd.), thus obtaining a solid electrolyte powder made of β"-alumina. All the above works were conducted in an atmosphere having a dew point minus 40° C. or below.

(1-a-2) Production of Solid Electrolyte Layer

Using sodium carbonate ($Na_2CO_3$), sodium hydrogen carbonate ($NaHCO_3$), magnesium oxide (MgO), aluminum oxide ($Al_2O_3$), zirconium oxide ($ZrO_2$), and yttrium oxide ($Y_2O_3$), powders of these raw materials were formulated to give a composition of, in terms of % by mole, 14.2% $Na_2O$, 5.5% MgO, 75.4% $Al_2O_3$, 4.7% $ZrO_2$, and 0.2% $Y_2O_3$. Thereafter, the raw material powders were wet mixed for four hours using ethanol as a medium. After ethanol was evaporated from the raw material powder mixture, an acrylic acid ester-based copolymer ("OLYCOX 1700" manufactured by Kyoeisha Chemical Co., Ltd.) as a binder and benzyl butyl phthalate as a plasticizer were used with the mixture, and these materials were weighed to give a ratio of raw material powders to binder to plasticizer of 83.5:15:1.5 (mass ratio) and dispersed into N-methylpyrrolidinone, followed by well stirring with a planetary centrifugal mixer to form a slurry.

The slurry obtained as above was applied onto a PET film using a doctor blade with a gap of 250 μm and dried at 70° C., thus obtaining a green sheet. Thereafter, the obtained green sheet was pressed at 90° C. and 40 MPa for five minutes using an isostatic pressing apparatus.

The pressed green sheet was fired at 1600° C. for 30 minutes, thus obtaining a 12-mm square, 50-μm thick solid electrolyte layer (solid electrolyte sheet) made of β"-alumina. The handling of the fired solid electrolyte layer was performed in an atmosphere having a dew point minus 40° C. or below.

(1-b) Preparation of Positive-Electrode Active Material Precursor Powder

Using sodium metaphosphate ($NaPO_3$), cobalt oxide (CoO), sodium carbonate ($Na_2CO_3$), and orthophosphoric acid ($H_3PO_4$) as raw materials, powders of these raw materials were prepared to give a composition of, in terms of % by mole, 30.3% $Na_2O$, 36.3% CoO, and 33.3% $P_2O_5$. The raw material powders were loaded into a quartz crucible and melted at 1300° C. for 90 minutes in an air atmosphere using an electric furnace. Next, resultant molten glass was poured between a pair of rotating rollers and formed into a shape with rapid cooling, thus obtaining a film-like glass body having a thickness of 0.1 mm to 2 mm.

The obtained film-like glass body was ground for five hours with a ball mill using 20-mm diameter $ZrO_2$ balls and the ground product was passed through a resin-made sieve with 120-μm openings, thus obtaining a coarse glass powder having an average particle diameter of 3 μm to 15 μm. Next, the coarse glass powder was ground, using ethanol as a grinding aid, for 80 hours with a ball mill using 3-mm diameter $ZrO_2$ balls, thus obtaining a glass powder (positive-electrode active material precursor powder) having an average particle diameter of 0.6 μm.

(1-c) Production of Positive Electrode Layer (Positive Electrode Composite material Layer)

The positive-electrode active material precursor powder, the solid electrolyte powder prepared in (1-a-1), and acetylene black were weighed to reach, in terms of % by mass, 72%, 25%, and 3%, respectively, (where the volume ratio between the positive-electrode active material precursor powder and the solid electrolyte powder was 76:24), and these powders were mixed for two hours using an agate-made mortar and an agate-made pestle. An amount of 20 parts by mass of N-methylpyrrolidinone (containing 10% by mass polypropylene carbonate) was added to 100 parts by mass of the obtained mixed powder and the mixture was stirred well with a planetary centrifugal mixer to form a slurry. All the above operations were conducted in an environment having a dew point minus 40° C. or below.

The obtained slurry was applied, with a 10-mm square and a thickness of 50 μm, to the center of one principal surface of the solid electrolyte layer produced in (1-a-2), and then dried at 70° C. for three hours. Next, the slurry was fired at 500° C. for 30 minutes in an atmosphere of nitrogen gas. Thus, a positive electrode layer was formed on the one principal surface of the solid electrolyte layer. The area of a solid electrolyte layer extended portion was, in plan view from the principal surface of the solid electrolyte layer on which the positive electrode layer was formed, 30.6% of the area of the solid electrolyte layer. As a result of observation of the obtained positive electrode layer with a transmission electron microscope (TEM), no lattice image corresponding to crystal structures was found in some regions of the layer and the presence of an amorphous phase was therefore confirmed. When the powder X-ray diffraction patterns of the materials making up the positive electrode layer were checked, a diffraction line originating from $Na_{3.64}Co_{2.18}(P_2O_7)_2$ crystals and respective crystalline diffraction lines originating from the solid electrolyte powders used were confirmed.

(1-d) Production of All-Solid-State Sodium Ion Secondary Batteries

A first metal film made of Al was formed on the positive electrode layer in the laminate of the solid electrolyte and the positive electrode layer obtained in (1-c), using a sputtering system ("SC-701AT" manufactured by Sanyu Electron Co., Ltd.). Thereafter, a 10-mm square metallic sodium serving as a negative electrode layer (thickness: 70 μm) was pressure-bonded to the center of the principal surface of the solid electrolyte opposite to the positive electrode layer, in an argon atmosphere having a dew point minus 60° C. or below.

Note that in accordance with the above process steps (1-a) to (1-d), two all-solid-state sodium ion secondary batteries were produced.

(1-e) Production of Bipolar All-Solid-State Sodium Ion Secondary Battery

The two all-solid-state sodium ion secondary batteries obtained in (a) to (d) were stacked with a current collector layer (current collector sheet) made of a 12-mm square Al foil (thickness: 3 μm) being interposed between them and the product was placed on a lower lid of a coin cell and covered with an upper lid, thus producing a CR2032-type test battery. In doing so, the two all-solid-state sodium ion secondary batteries and the current collector layer were laid one upon another so that, when viewed in plan, the current collector layer includes an extended portion extending outwardly of the positive electrode layer and the negative electrode layer. The area of the extended portion was, in plan view from the principal surface of the current collector layer on which the positive electrode layer was laid, 30.6% of the total area of the extended portion and the current collector layer. The area of the extended portion was, in plan view from the principal surface of the current collector layer on which the negative electrode layer was laid, 30.6% of the total area of the extended portion and the current collector layer.

In the above manner, a bipolar all-solid-state sodium ion secondary battery was obtained. FIG. 11 shows a schematic cross-sectional view showing the bipolar all-solid-state sodium ion secondary battery in Example 1.

Comparative Example 1

As Comparative Example 1, an all-solid-state sodium ion secondary battery was produced in the same manner as in (1-a) to (1-d) in Example 1, placed on a lower lid of a coin cell, and covered with an upper lid, thus producing a CR2032-type test battery. Note that the test battery was not a bipolar all-solid-state sodium ion secondary battery.

(Charge and Discharge Test)

The produced batteries for evaluation in Example 1 and Comparative Example 1 were charged with CC (constant-current) from the open circuit voltage at 30° C. for 10 hours. Next, the batteries were discharged with CC at 30° C. The C rate during charge and discharge was 0.1 C.

FIG. 12 is a graph showing charge and discharge curves of the battery for evaluation in Comparative Example 1. FIG. 13 is a graph showing charge and discharge curves of the battery for evaluation in Example 1.

As shown in FIG. 12, the voltage obtained from the battery for evaluation in Comparative Example 1 was 4.3 V. On the other hand, as shown in FIG. 13, the voltage obtained from the battery for evaluation in Example 1 was 8.4 V. It can be seen from this that a high voltage was obtained in Example 1.

Example 2

(2-a) Production of Solid Electrolyte (2-a-1) Preparation of Solid Electrolyte Powder A solid electrolyte powder made of β"-alumina was prepared in the same manner as in Example 1.

(2-a-2) Production of Solid Electrolyte Layer

A solid electrolyte layer (solid electrolyte sheet) made of β"-alumina was produced in the same manner as in Example 1. In this example, the solid electrolyte layer was produced to have a 11-mm square size and a thickness of 50 μm.

(2-b) Preparation of Positive-Electrode Active Material Precursor Powder

Using sodium metaphosphate ($NaPO_3$), iron oxide (III) ($Fe_2O_3$), sodium carbonate ($Na_2CO_3$), and orthophosphoric acid ($H_3PO_4$) as raw materials, powders of these raw materials were prepared to give a composition of, in terms of % by mole, 40% $Na_2O$, 20% $Fe_2O_3$, and 40% $P_2O_5$. The raw material powders were loaded into a platinum crucible and melted at 1300° C. for 90 minutes in an air atmosphere using an electric furnace. Next, resultant molten glass was poured between a pair of rotating rollers and formed into a shape with rapid cooling, thus obtaining a film-like glass body having a thickness of 0.1 mm to 2 mm.

The obtained film-like glass body was ground for five hours with a ball mill using 20-mm diameter $ZrO_2$ balls and the ground product was passed through a resin-made sieve with 120-μm openings, thus obtaining a coarse glass powder having an average particle diameter of 18 μm. Next, the coarse glass powder was ground, using ethanol as a grinding aid, for 80 hours with a ball mill using 3-mm diameter $ZrO_2$ balls, thus obtaining a glass powder (positive-electrode active material precursor powder) having an average particle diameter of 0.6 μm.

(2-c) Production of Positive Electrode Layer (Positive Electrode Composite material Layer)

The positive-electrode active material precursor powder, the solid electrolyte powder prepared in (2-a-1), and acetylene black were weighed to reach, in terms of % by mass, 72%, 25%, and 3%, respectively, (where the volume ratio between the positive-electrode active material precursor powder and the solid electrolyte powder was 76:24), and these powders were mixed for two hours using an agate-made mortar and an agate-made pestle. An amount of 20 parts by mass of N-methylpyrrolidinone (containing 10% by mass polypropylene carbonate) was added to 100 parts by mass of the obtained mixed powder and the mixture was stirred well with a planetary centrifugal mixer to form a slurry. All the above operations were conducted in an environment having a dew point minus 40° C. or below.

The obtained slurry was applied, with a 10-mm square and a thickness of 70 μm, to the center of one principal surface of the solid electrolyte layer produced in (2-a-2), and then dried at 70° C. for three hours. Next, the slurry was fired at 530° C. for 60 minutes in an atmosphere of mixed gas of 4% by volume $H_2$ and 96% by volume $N_2$. Thus, a positive electrode layer was formed on the one principal surface of the solid electrolyte layer. The area of a solid electrolyte layer extended portion was, in plan view from the principal surface of the solid electrolyte layer on which the positive electrode layer was formed, 17.4% of the area of the solid electrolyte layer. As a result of observation of the obtained positive electrode layer with a transmission electron microscope (TEM), no lattice image corresponding to crystal structures was found in some regions of the layer and the presence of an amorphous phase was therefore confirmed. When the powder X-ray diffraction patterns of the materials making up the positive electrode composite material layer were checked, a diffraction line originating from $Na_2FeP_2O_7$ crystals and respective crystalline diffraction lines originating from the solid electrolyte powders used were confirmed.

(2-d) Production of All-Solid-State Sodium Ion Secondary Batteries

A first metal film made of Al was formed on the positive electrode layer in the laminate of the solid electrolyte and the positive electrode layer obtained in (2-c), using a sputtering system ("SC-701AT" manufactured by Sanyu Electron Co., Ltd.). Thereafter, a 10-mm square metallic sodium serving as a negative electrode layer (thickness: 70 μm) was pressure-bonded to the center of the principal surface of the solid electrolyte opposite to the positive electrode layer, in an argon atmosphere having a dew point minus 60° C. or below. Note that in accordance with the above process steps (2-a) to (2-d), two all-solid-state sodium ion secondary batteries were produced.

(2-e) Production of Bipolar All-Solid-State Sodium Ion Secondary Battery

The two all-solid-state sodium ion secondary batteries obtained in (2-a) to (2-d) were stacked with a current collector layer (current collector sheet) made of a 10.5-mm square Al foil (thickness: 3 μm) being interposed between them and the product was placed on a lower lid of a coin cell and covered with an upper lid, thus producing a CR2032-type test battery. In doing so, the two all-solid-state sodium ion secondary batteries and the current collector layer were laid one upon another so that, when viewed in plan, the current collector layer includes an extended portion extending outwardly of the positive electrode layer and the negative electrode layer. The area of the extended portion was, in plan view from the principal surface of the current collector layer on which the positive electrode layer was laid, 9.3% of the total area of the extended portion and the current collector layer. The area of the extended portion was, in plan view from the principal surface of the current collector layer on which the negative electrode layer was laid, 9.3% of the total area of the extended portion and the current collector layer. In the above manner, a bipolar all-solid-state sodium ion secondary battery was obtained.

Example 3

Three all-solid-state sodium ion secondary batteries were produced in the same manner as in Example 2. A laminate was produced by stacking the three all-solid-state sodium ion secondary batteries with a current collector layer (current collector sheet) made of a 10.5-mm square Al foil (thickness: 3 μm) being interposed between each pair of adjacent all-solid-state sodium ion secondary batteries. The laminate was placed on a lower lid of a coin cell and covered with an upper lid, thus producing a CR2032-type test battery. In doing so, the three all-solid-state sodium ion secondary batteries and the current collector layers were laid one upon another so that, when viewed in plan, each current collector layer includes an extended portion extending outwardly of the positive electrode layer and the negative electrode layer. The area of each extended portion was, in plan view from the principal surface of the current collector layer on which the positive electrode layer was laid, 9.3% of the total area of the extended portion and the current collector layer. The area of each extended portion was, in plan view from the principal surface of the current collector layer on which the negative electrode layer was laid, 9.3% of the total area of the extended portion and the current collector layer. In the above manner, a bipolar all-solid-state sodium ion secondary battery was obtained.

Comparative Example 2

As a comparative example, an all-solid-state sodium ion secondary battery was produced in the same manner as in (2-a) to (2-d) in Example 2, placed on a lower lid of a coin cell, and covered with an upper lid, thus producing a CR2032-type test battery. Note that the test battery was not a bipolar all-solid-state sodium ion secondary battery.

(Charge and Discharge Test)

The produced batteries for evaluation in Example 2 and 3 and Comparative Example 2 were charged with CC (constant-current) from the open circuit voltage at 60° C. for 100 hours. Next, the batteries were discharged with CC at 60° C. The C rate during charge and discharge was 0.01 C.

FIG. 14 is a graph showing charge and discharge curves of the batteries for evaluation in Examples 2 and 3 and Comparative Example 2. In FIG. 14, the solid lines represent the results in Example 2, the dash-double-dot lines represent the results in Example 3, and the broken lines represent the results in Comparative Example 2.

As shown in FIG. 14, the voltage obtained from the battery for evaluation in Comparative Example 2 was 2.8 V. On the other hand, the voltage obtained from the battery for evaluation in Example 2 was 5.7 V and the voltage obtained from the battery for evaluation in Example 3 was 8.3 V. It can be seen from this that a high voltage was obtained in Examples 2 and 3.

Example 4

(4-a) Production of Solid Electrolyte

A solid electrolyte powder and a solid electrolyte layer were produced in the same manner as in (2-a) in Example 2.

(4-b) Preparation of Positive-Electrode Active Material Precursor Powder

A positive-electrode active material precursor powder was prepared in the same manner as in (2-b) in Example 2 except that using sodium metaphosphate ($NaPO_3$), nickel oxide (NiO), sodium carbonate ($Na_2CO_3$), and orthophosphoric acid ($H_3PO_4$) as raw materials, powders of these raw materials were prepared to give a composition of, in terms of % by mole, 30.3% $Na_2O$, 36.4% NiO, and 33.3% $P_2O_5$.

(4-c) Production of Positive Electrode Layer (Positive Electrode Composite Material Layer)

A positive electrode layer was formed on one principal surface of the solid electrolyte layer in the same manner as in (2-c) in Example 2 except that the solid electrolyte powder and the solid electrolyte layer each obtained in (4-a) and the positive-electrode active material precursor powder obtained in (4-b) were used and the firing condition was set at 625° C. for 30 minutes in an atmosphere of $N_2$ gas. As a result of observation of the obtained positive electrode layer with a transmission electron microscope (TEM), no lattice image corresponding to crystal structures was found in some regions of the layer and the presence of an amorphous phase was therefore confirmed. When the powder X-ray diffraction patterns of the materials making up the positive electrode composite material layer were checked, a diffraction line originating from $Na_{3.64}Ni_{2.18}(P_2O_7)_2$ crystals and respective crystalline diffraction lines originating from the solid electrolyte powders used were confirmed.

(4-d) Production of All-Solid-State Sodium Ion Secondary Batteries

Two all-solid-state sodium ion secondary batteries were produced in the same manner as in (2-d) in Example 2.

(4-e) Production of Bipolar All-Solid-State Sodium Ion Secondary Battery

A bipolar all-solid-state sodium ion secondary battery was produced in the same manner as in (2-e) in Example 2.

Comparative Example 3

As a comparative example, an all-solid-state sodium ion secondary battery was produced in the same manner as in (4-a) to (4-d) in Example 4, placed on a lower lid of a coin cell, and covered with an upper lid, thus producing a CR2032-type test battery. Note that the test battery was not a bipolar all-solid-state sodium ion secondary battery.

(Charge and Discharge Test)

The produced batteries for evaluation in Example 4 and Comparative Example 3 were charged with CC (constant-current) from the open circuit voltage at 60° C. for 100 hours. Next, the batteries were discharged with CC at 60° C. The C rate during charge and discharge was 0.01 C. In Example 4, the end-of-charge voltage was set at 10.4 V and the end-of-discharge voltage was set at 4 V. In Comparative Example 3, the end-of-charge voltage was set at 5.2 V and the end-of-discharge voltage was set at 2 V.

In the battery for evaluation in Comparative Example 3, the obtained discharge voltage was 4.7 V and the discharge capacity was 51 mAh/g. On the other hand, in the battery for evaluation in Example 4, the obtained discharge voltage was 9.4 V and the discharge capacity was 50 mAh/g. It can be seen from this that a high voltage was obtained in Example 4.

REFERENCE SIGNS LIST

1 . . . all-solid-state sodium ion secondary battery
2 . . . current collector layer
2a . . . first principal surface
2b . . . second principal surface
3 . . . positive electrode layer
4 . . . solid electrolyte layer
4a . . . third principal surface
4b . . . fourth principal surface
5 . . . negative electrode layer
6 . . . extended portion
7 . . . first metal film
8 . . . second metal film
9 . . . solid electrolyte layer extended portion
10 . . . bipolar all-solid-state sodium ion secondary battery
27 . . . first metal film
28 . . . second metal film
34 . . . solid electrolyte layer 39 . . . solid electrolyte layer extended portion
44 . . . solid electrolyte layer
54 . . . solid electrolyte layer
56 . . . extended portion
59 . . . solid electrolyte layer extended portion
66 . . . extended portion

The invention claimed is:

1. A bipolar all-solid-state sodium ion secondary battery comprising:
   a plurality of all-solid-state sodium ion secondary batteries in each of which a positive electrode layer capable of absorbing and releasing sodium, a solid electrolyte layer made of a sodium ion-conductive oxide, and a negative electrode layer capable of absorbing and releasing sodium are laid one upon another in this order; and
   a current collector layer provided between the positive electrode layer of a first one of the plurality of all-solid-state sodium ion secondary batteries and the negative electrode layer of a second one of the plurality of all-solid-state sodium ion secondary batteries adjacent to the first one of the plurality of all-solid-state sodium ion secondary batteries; wherein
   an extended portion is provided which, in a plan view of the bipolar all-solid-state sodium ion secondary battery, is continued from an outer peripheral edge of the current collector layer and extends outwardly of an outer peripheral edge of the positive electrode layer and/or an outer peripheral edge of the negative electrode layer; and
   the extended portion has an area of not less than 1% and not more than 35% of a total area of the extended portion and the current collector layer in the plan view.

2. The bipolar all-solid-state sodium ion secondary battery according to claim 1, wherein the extended portion is made of the same material as the current collector layer.

3. The bipolar all-solid-state sodium ion secondary battery according to claim 1, wherein the extended portion is made of a different material from the current collector layer.

4. The bipolar all-solid-state sodium ion secondary battery according to claim 1, wherein the solid electrolyte layer has a portion extending outwardly of an outer peripheral edge of the positive electrode layer and/or an outer peripheral edge of the negative electrode layer in the plan view.

5. The bipolar all-solid-state sodium ion secondary battery according to claim 4, wherein the portion of the solid electrolyte layer extending outwardly of the outer peripheral edge of the positive electrode layer and/or the outer peripheral edge of the negative electrode layer has an area of not less than 1% and not more than 50% of an area of the solid electrolyte layer in the plan view.

6. The bipolar all-solid-state sodium ion secondary battery according to claim 1, wherein the current collector layer is made of at least one selected from the group consisting of aluminum, titanium, silver, copper, stainless steel, graphite, and alloys containing one or more of aluminum, titanium, silver, copper, and stainless steel.

7. The bipolar all-solid-state sodium ion secondary battery according to claim 1, wherein the solid electrolyte layer contains at least one material of $\beta$-alumina, $\beta''$-alumina, and NASICON crystals.

* * * * *